United States Patent [19]

Lippel

[11] Patent Number: 4,652,905
[45] Date of Patent: Mar. 24, 1987

[54] INSTANTANEOUS NEUTRAL COLORS IN DITHER-QUANTIZED COLOR TELEVISION

[75] Inventor: Bernard Lippel, West Long Branch, N.J.

[73] Assignee: Quanticon Inc., West Long Branch, N.J.

[21] Appl. No.: 697,052

[22] Filed: Jan. 31, 1985

Related U.S. Application Data

[63] Continuation-in-part of Ser. No. 354,138, Mar. 5, 1982, Pat. No. 4,568,966, which is a continuation-in-part of Ser. No. 897,860, Apr. 19, 1978, Pat. No. 4,275,411.

[51] Int. Cl.[4] ............................................. H04N 11/04
[52] U.S. Cl. ......................................................... 358/13
[58] Field of Search ............................................. 358/13

[56] References Cited

U.S. PATENT DOCUMENTS 4,275,411  6/1981  Lippel ................................... 358/13
4,594,726  6/1986  Willis .................................... 358/23

FOREIGN PATENT DOCUMENTS 30115   3/1977  Japan .................................... 358/13
137380  8/1983  Japan .................................... 358/13
32278   2/1984  Japan .................................... 358/13

OTHER PUBLICATIONS

Fink, Electronics Engineer's Handbook, Television and Facsimille Systems 20—82-20—87, 1982.
Hall, Computer Image Processing and Recognition, p. 350, 1979.

Primary Examiner—John W. Shepperd

[57] ABSTRACT

The chrominance constituent of a color-television picture is transmitted by means of chrominance samples dither-quantized according to a small number of transmittable chrominance values. By use of a look-up table or equivalent analog means, the chrominance vector can be quantized directly; else vector components are quantized. Three-dimensional dither causes the TV picture to be displayed with pointillistically colored micropatterns that change from frame to frame. The effectiveness of psychovisual filtering in time and space domains, which effectively suppresses these micropatterns, is improved by arranging that neutral-colored (e.g. gray) elements shall be generated directly on each frame. This can be done by making zero chrominance a transmittable quantum value, or otherwise as in disclosed examples.

22 Claims, 11 Drawing Figures

FIG. 10

INSTANTANEOUS NEUTRAL COLORS IN DITHER-QUANTIZED COLOR TELEVISION

This application is a continuation-in-part of copending application Ser. No. 354,138 now U.S. Pat. No. 4,568,966, filed Mar. 5, 1982, entitled "Compatible Color Television with Regenerable Signals" which was a continuation-in-part of U.S. application Ser. No. 897,860 filed Apr. 19, 1978, now U.S. Pat. No. 4,275,411. Ser. No. 224,679, filed Jan. 13, 1981, now U.S. Pat. No. 4,460,924 was a continuation of the above Ser. No. 897,860.

BACKGROUND

Color television is ordinarily transmitted by means of a set of video signals comprising a luminance signal and two signals that are vector components of the chrominance. The copending application Ser. No. 354,138 now U.S. Pat. No. 4,568,966 and related U.S. Pat. Nos. 4,275,411 and 4,460,924 disclose color-television transmission with at least one of said video signals dither-quantized according to very coarsely quantized samples. The related patents disclose various digital and other systems for transmitting the information of said samples while the copending application has particular reference to systems transmitting a signal that remains compatible with NTSC receivers or other analog receivers. The aforementioned disclosures also include embodiments applicable to video recording and means for television encryption.

This application concerns color television systems that send color information in terms of dither-quantized samples corresponding to only a few discrete chrominance values and use 3-dimensional dithers that allow substantially normal pictures to be perceived. All references herein to the copending application refer to my application Ser. No. 354,138 now U.S. Pat. No. 4,568,966.

For purposes of this application, chrominance is defined as the vector sum of two chrominance components (typically I and Q or $R-Y$ and $B-Y$) in quadrature. A point of the I-Q plane represents a particular value of the chrominance vector (I,Q). The same vector may be written (H,S) in polar coordinates, where H is the polar angle corresponding to hue and S is the polar distance corresponding to chrominance amplitude. Point (0,0), the origin of both Cartesian and polar coordinates, is the "neutral point" associated with zero (or neutral) chrominance, found in black, white and gray picture details. The color subcarrier used in the NTSC system of color television is quadrature-modulated so that its phase is the analog of H and its amplitude the analog of S.

SUMMARY

Dither-quantized TV systems improved according to the invention generate black-and-white picture details directly on each frame of the received picture, and not by blending colors of neighboring elements or of successive frames. Instantaneous transmission of the zero chrominance value reduces the likelihood that colored artifacts will be perceived in stationary and moving details of the TV picture. Chrominance is quantized by quantizing a plurality of vector components or by quantizing the chrominance vector directly. Vector-quantizing means offer greater flexibility and are easily implemented in digital TV systems.

OBJECTS

An object of the invention is to improve the quality of the displayed picture in a TV system transmitting a luminance constituent accompanied by a dither-quantized chrominance constituent.

Another object is to improve the quality of said chrominance constituent.

Another object is to minimize perceptibility of colored artifacts that may occur when chrominance is dither-quantized.

Yet another object is to achieve the foregoing objects with little or no increase in bandwidth or channel capacity, or while decreasing the same.

DETAILED DISCLOSURE

Although NTSC signals and matrix transformations are assumed for explaining the invention, it will be clear to persons having normal skill in the art that I may use standards and practices of other systems instead, without departing from the spirit of the invention.

Figure 1:
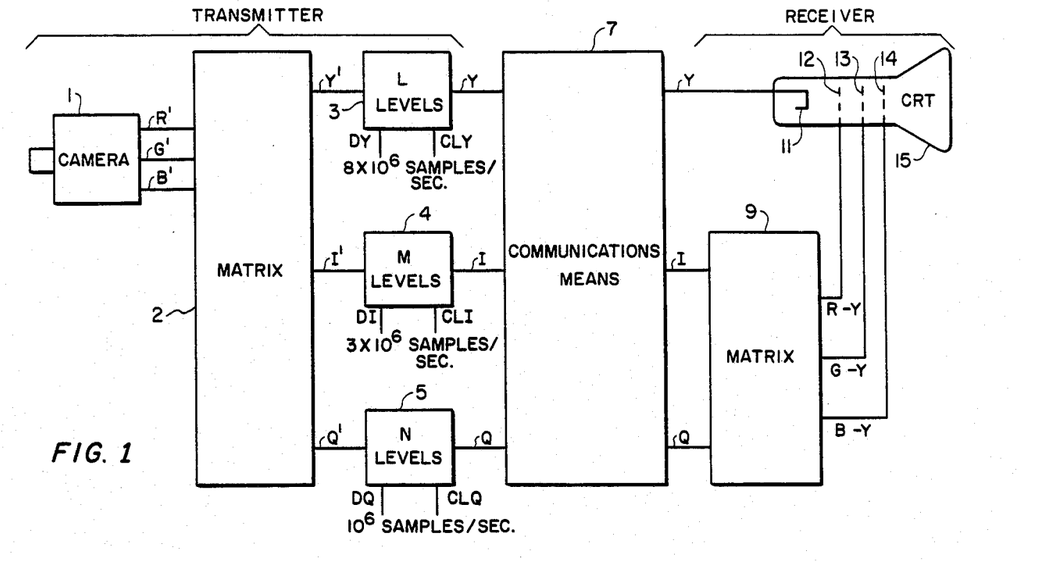
FIG. 1 is a simplified schematic diagram generally representing a class of color TV systems of the copending application and certain embodiments of the present application characterized by two separately-quantized chrominance components.

The simplified schematic diagram of FIG. 1 represents a class of television systems (including systems of the copending application) that are characterized by separate dither-quantizing of at least two chrominance components, and the invention will be described first as it relates to such systems. Matrix 2 of the figure converts NTSC red, green and blue primary video signals R', G' and B' into the NTSC luminance signal Y' and chrominance components I' and Q'. Assuming that all three primary signals are positive, Y' is likewise positive but I' and Q' may be sometimes positive and sometimes negative. Dither-quantizing means, represented by simplified units 3, 4 and 5, change the three outputs from matrix 2 into three dither-quantized signals, correspondingly labelled Y, I and Q, which communications means 7 transmits to a TV receiver. The copending application discloses details of the dither-quantizing means, including suitable exemplary sampling rates and exemplary means for generating dithers DY, DI and DQ and clocks CLY, CLI and CLQ of FIG. 1. Approximating the sampling rates shown in FIG. 3 of said application, L-levels Y samples are assumed in FIG. 1 to occur at the rate of $8 \times 10^6$ per sec., M-levels I samples at $3 \times 10^6$ per sec. and N-levels Q samples at $10^6$ per sec. (Although FIG. 3 of the copending application shows $M=N=2$ and $L=4$, persons skilled in the art will realize that the sampling rates are independent of the number of quantum levels.) Samples of the I and Q components are assumed (as in the copending application) to be in non-return-to-zero form, and clocks CLI and CLQ are, merely for convenience, assumed to be synchronized so that every Q sample is contemporaneous with three I samples.

Communications means 7 transmits Y, I and Q to a receiver, usually in the form of a composite signal. It may include means for signal regeneration, or for reversible processes such as recording and reproduction or encryption and decryption.

In the receiver portion of FIG. 1, luminance signal Y is shown delivered to cathode 11 of tricolor picture tube 15, while I and Q are delivered to matrix 9 which obtains color differences $R-Y$, $G-Y$ and $B-Y$ by means of the following transformations:

$$R-Y=0.96I+0.62Q$$

$$G-Y=-0.27I-0.65Q$$

$$B-Y=-1.11I+1.70Q$$

The three color differences are unequal unless both I and Q are zero, in which case all of the color differences are zero.

$R-Y$, $G-Y$ and $B-Y$ are respectively delivered to grids 12, 13 and 14 which control red, green and blue color generation in the picture tube. To generate black, white or gray picture elements, all three grids are zero and only Y, on the tube cathode, determines electron-beam accelerations that excite red, green and blue phosphors in the proportions needed for white light. On the other hand, unless I and Q are simultaneously zero, signals appear on some of the control grids and generated picture elements are colored to some degree. The pel (luminance-picture element) which is excited on the screen of picture tube 15 to display a sample of Y is large enough to encompass a triad of red, green and blue phosphor elements. Chrominance-picture elements, corresponding to I and Q samples, are larger than a pel, since there are fewer samples to the line.

All dithers referred to herein, including DY, DI and DQ of FIG. 1, are 3-dimensional; that is to say they are characterized by frame-to-frame changes in the patterns of dither samples, leading to frame-to-frame changes in the dither-quantized signals. The 4-phase nasik dithers generated according to FIG. 8 of the copending application are examples of satisfactory, but not necessarily optimum, dithers. (R-phase dithers repeat after R frames.) Dithers constructed to have advantageous dither-quantizing properties are not, in themselves, part of the invention.

FIG. 1 is arranged to show so-called "picture tube matrixing", merely to distinguish more clearly between the luminance constituent sent over the Y channel and the chrominance constituent sent over the combined I and Q channels. However, persons skilled in the art know that the receiver matrix may alternatively convert the set of Y, I and Q into R, G and B signals to display the same picture, comprising the same luminance and chrominance constituents. The R, G, B form of matrixing is shown in FIG. 4 of the copending application and is sometimes preferred, especially in systems using separate red, green and blue projectors.

Whereas the picture displayed in accordance with FIG. 1 can be separated into luminance and chrominance constituents, the chrominance constituent, in turn, is resolvable into one component picture consisting of M-level I elements and another component picture consisting of N-level Q elements. In view of the assumed sampling, I elements are streaks occurring approximately 150 to the line on all 525 lines of the NTSC raster and Q elements are three times as long, likewise on all lines of the raster. Sampling is assumed to be synchronized so that the streak corresponding to a Q element overlaps three I elements. Chrominance elements, corresponding to combinations of I and Q, are therefore similar to I elements in size and shape and are quantized according to MN chrominance values, called herein transmittable chrominance vectors, abbreviated tcv's.

It is preferable that the relationship between luminance input Y' and the mean value of resultant Y samples shall be substantially linear. Therefore, means 3 of FIG. 1 preferably quantizes according to uniformly spaced quantum levels and the peak-to-peak amplitude of dither DY is set so that said relationship is linear, the Y samples fluctuating between two adjacent levels when Y' is constant at a non-quantum value. Strictly linear dither-quantizing is less important for the I and Q components; therefore, the I and Q levels may optionally vary somewhat in spacing, as exemplified in FIGS. 2A and 2B. However, the peak-to-peak DI and DQ amplitudes are preferably fixed at values that insure that dither-quantized component samples do not fluctuate over more than two adjacent I or Q levels so long as the chrominance input remains constant.

Figure 2A:
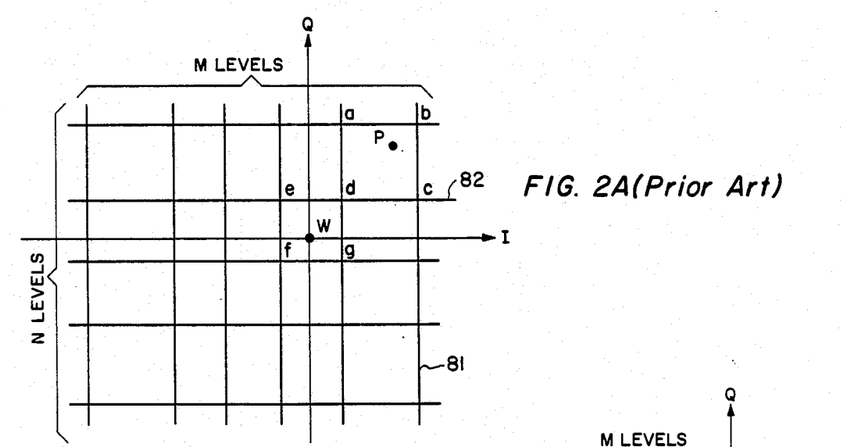
FIG. 2A represents the I-Q plane and shows M quantum levels in the I coordinate and N quantum levels in the Q coordinate, none of the quantum levels passing through the origin.

FIG. 2A shows the I-Q chrominance plane and represents thereon M quantum levels of I, including typical level 81, and N quantum levels of Q, including typical level 82. Points a through g exemplify MN intersection points corresponding to a like number of tcv's; these are the only values of chrominance actually transmitted for elements of a TV frame. If an extended area of the picture has uniform non-tcv chrominance P, such chrominance is synthesized on every frame approximately, by means of a pointillistic mixture of elementary streaks having chrominance restricted to tcv's a, b, c and d, located at the corners of the square that surround P in FIG. 2A. The pointillistic micropattern changes from frame to frame and, assuming that DI and DQ are 4-phase dithers, it repeats cyclically after four frames. Time-domain averaging of the mix of four samples at a point of the TV raster effectively synthesizes, in this example, up to 21 streak chrominance values which are additional to the four tcv's. Furthermore, even more chrominance values may be perceived subjectively because pointillistic micropatterns comprising streaks that vary in chrominance are also averaged spatially in the eye and mind of the viewer.

Inasmuch as FIG. 2A (contrary to the invention) does not show I and Q quantum levels at zero, the neutral point W=(0,0) is not a tcv. To display black, white or gray picture details in the corresponding systems of prior art, neutral chrominance is synthesized from the surrounding group of tcv's, designated d,e,f,g on the figure. This group has each tcv in a different quadrant of the I-Q plane, signifying that their polar-coordinate angles can differ by as much as 180°, corresponding to substantially complementary hues in each of two pairs.

Figure 2B:
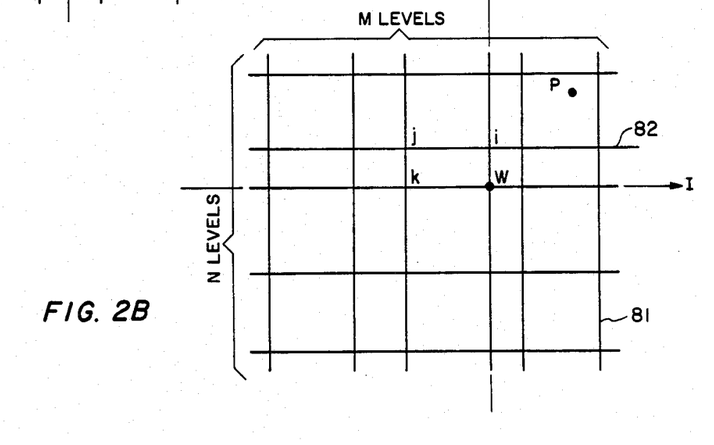
FIG. 2B is similar, except that one I quantum level and one Q quantum level pass through the origin.

FIG. 2B shows the I-Q plane with quantum levels and tcv's rearranged according to the invention applied to the FIG. 1 embodiment. Specifically, both I and Q chrominance components are quantized with quantum levels at zero, making W a tcv. Matrix 9 of FIG. 1 can therefore generate neutral chrominance samples and black-and-white picture elements can be generated on the individual TV frames. Furthermore, every group of tcv's from which other chrominances may be synthesized lies entirely in one quadrant of the I-Q plane; hence the largest possible hues difference between tcv's of such a group (e.g. the difference between i and k of FIG. 2B) is 90°.

I have determined that the range of optimal viewing conditions under which a viewer receives the impression of a normally colored TV pictures can be extended significantly by arranging that synthetic chrominances shall be formed from groups of tcv's that do not include complementary, or nearly complementary, hues. For systems of the type shown in FIG. 1, this corresponds to FIG. 2B, rather than FIG. 2A. Avoidance of large hues differences avoids strong color contrasts among the elementary streaks of dynamically changing micropatterns, making the streaks and possible artifacts related thereto harder to perceive.

Figure 3:
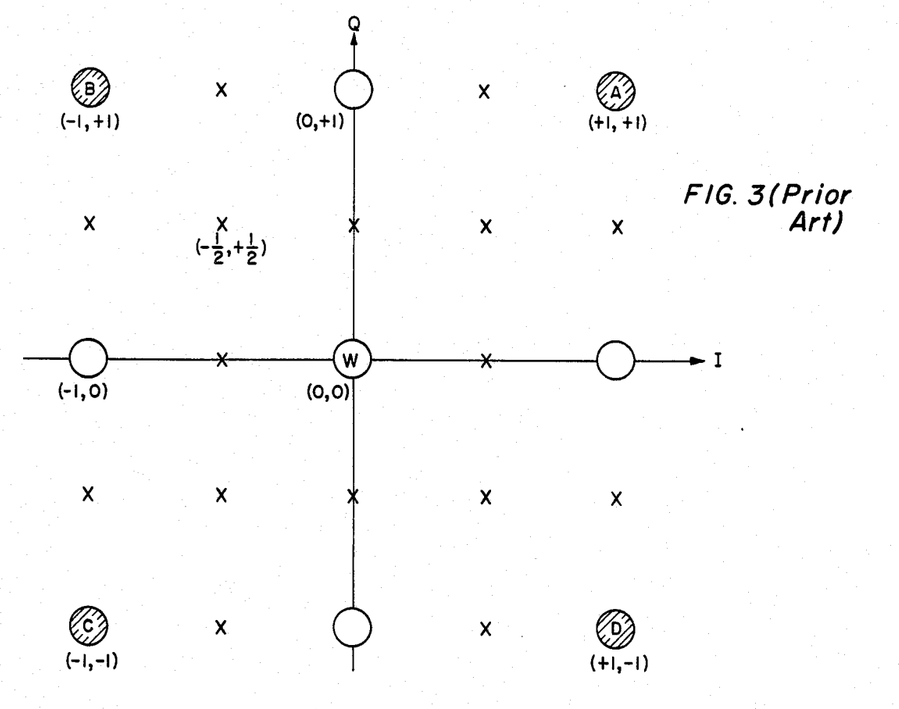
FIG. 3 represents the I-Q plane and shows thereon four points corresponding to transmittable chrominance vectors (tcv's) and additional points, each corresponding to the mean of a set of four vectors wherein each vector has the value of a tcv.

Because it is ordinarily desirable that the number of I and Q levels shall be very small, the cases of $M=N=2$ and $M=N=3$ are especially important in practice. FIG. 3 is similar to FIG. 15 of the copending application and relates to 2-level quantizing, not consistent with the invention but discussed herein for purposes of comparison. Since $MN=4$ in this case, the entire picture is transmitted with only four tcv's, conveniently assumed to be $A=(+1,+1)$, $B=(-1,+1)$, $C=(-1,-1)$ and $D=+1,-1)$, shown by shaded circles on FIG. 3. Since rectangle ABCD includes both positive and negative values of both I and Q in order to cover the gamut of chrominance values needed for color television, neutral point $W=(0,0)$ cannot be a tcv. For black-and-white picture details, W is synthesized from one or both of the complementary pairs A,C and B,D; the 4-frames sequence at a neutral raster point may proceed, for example, like AACC, BDBD or ABCD, all of which have a mean value of (0,0). Consider also the example of $(-\frac{1}{2},+\frac{1}{2})$: it can be synthesized by averaging of BBBD or BBAC, in which the two pairs A,C and B,D are associated with complementary hues. FIG. 3 shows 21 chrominances that can be synthesized in this fashion by 4-frame averaging at a single picture point; these include five that, like W, can be formed with only two successive frames and are designated by open circles, and 16 more that, like $(-\frac{1}{2},+\frac{1}{2})$, need four frames and are marked with x's. Only the eight x's on the periphery can be formed without a pair of complementary hues.

Figure 4:
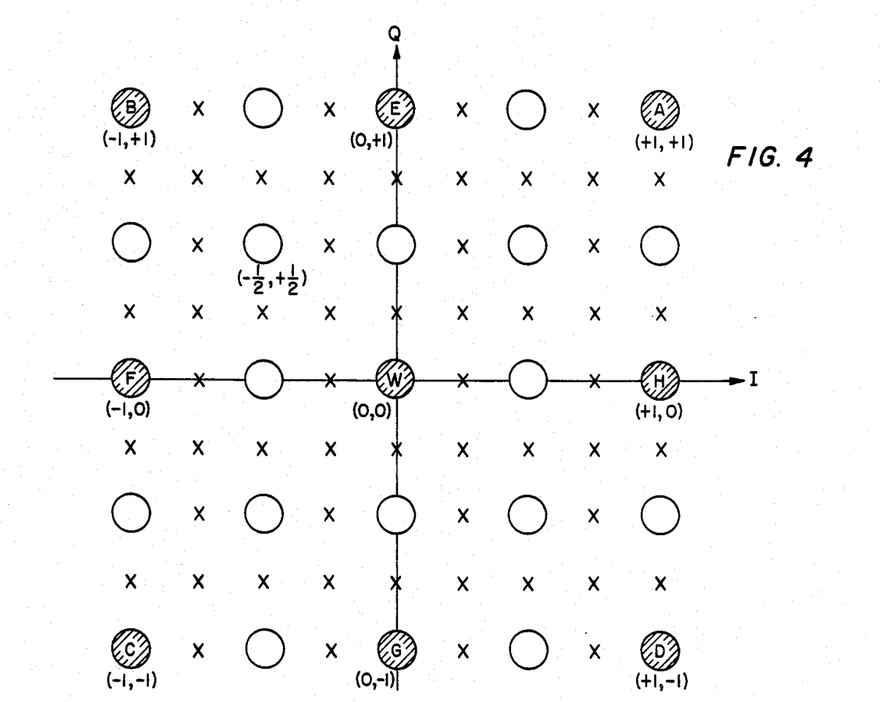
FIG. 4 is similar to FIG. 3 but shows nine tcv's, including one at the neutral point.

FIG. 4 corresponds to the invention when $M=N=3$, or $MN=9$. Dither-quantizing means 4 and 5 of FIG. 1 are constructed so that I and Q are quantized with quantum levels at zero and additional positive and negative levels, conveniently assumed to be at $+1$ and $-1$. This provides nine tcv's, shown by means of shaded circles, including A,B,C and D of FIG. 3 in addition to the neutral point $W=(0,0)$, $E=(0,+1)$, $F=(-1,0)$, $G=(0,-1)$ and $H=(+1,0)$. A non-tcv chrominance is synthesized from four of these tcv's all of which lie in one quadrant of the I-Q plane. Time-domain averaging with 4-phase dithers provides up to 81 chrominances at individual points of the picture, including 16 obtainable as 2-frame averages. The particular example of $(-\frac{1}{2},+\frac{1}{2})$ can be synthesized from WWBB or WEBF, respectively corresponding to maximum hues differences of zero and 90°.

More generally, M and N may be any small integers and the improvement of the FIG. 1 system disclosed herein is made by providing, both for I and for Q: a quantum level at zero, at least one quantum level at a positive value of the chrominance component, and at least one quantum level at a negative value thereof; it is not essential that levels be spaced uniformly.

The disclosure has thus far described separate dither-quantizing of two chrominance components. More generally, however, I may dither-quantize the chrominance vector itself as depicted ideally in FIG. 5. The latter figure shows chrominance plane 100 divided into discrete quantum neighborhoods labelled 101 to 109, and having in each neighborhood a particular chrominance point correspondingly labelled from $T_{101}$ to $T_{109}$. Such a point is the tcv that replaces all other chrominance vectors of the neighborhood. If chrominance $(I_z,Q_z)$ is to be dither-quantized, two preferably orthogonal dithers are added thereto; in FIG. 5, DI and DQ of FIG. 1 are added, with peak-to-peak amplitudes such that the dithered vector $(I_z+DI,Q_z+DQ)$ wanders about a 2-dimensional range 20, outlined with a dotted line. In the depicted case, the dithered vector lands mostly in neighborhood 101, but a part of its range is in 103 and a smaller portion is in 104. Consequently, chrominance $(I_z,Q_z)$ is transmitted as a larger number of $T_{101}$ samples, a smaller number of $T_{103}$ samples, and occasional $T_{104}$ samples, all interleaved in a manner that depends on the DI and DQ dither patterns. In principle, any number of tcv values could be interleaved.

Since one tcv ($T_{101}$ of FIG. 5) is located at the neutral point this quantization permits black-and-white picture details on the individual TV frames. Furthermore, the neutral neighborhood 101 may be made sufficiently large in relation to dither range 20 to insure that the set of tcv's from which a chrominance is synthesized never includes complementary, or near-complementary, hues. Chrominance near a boundary between neighborhoods is always sent as a mixture of tcv's that changes gradually across the boundary, thereby avoiding artificial color contours. Systems similar to that represented in FIG. 5 do no remap chrominance in strictly linear fashion. For example: on FIG. 5, all points inside dotted boundary line 21 are quantized $T_{101}$ and all points within boundary 22 are quantized $T_{106}$. Ordinarily, such departures from linearity have no objectionable effect on the displayed color picture.

Figure 5:
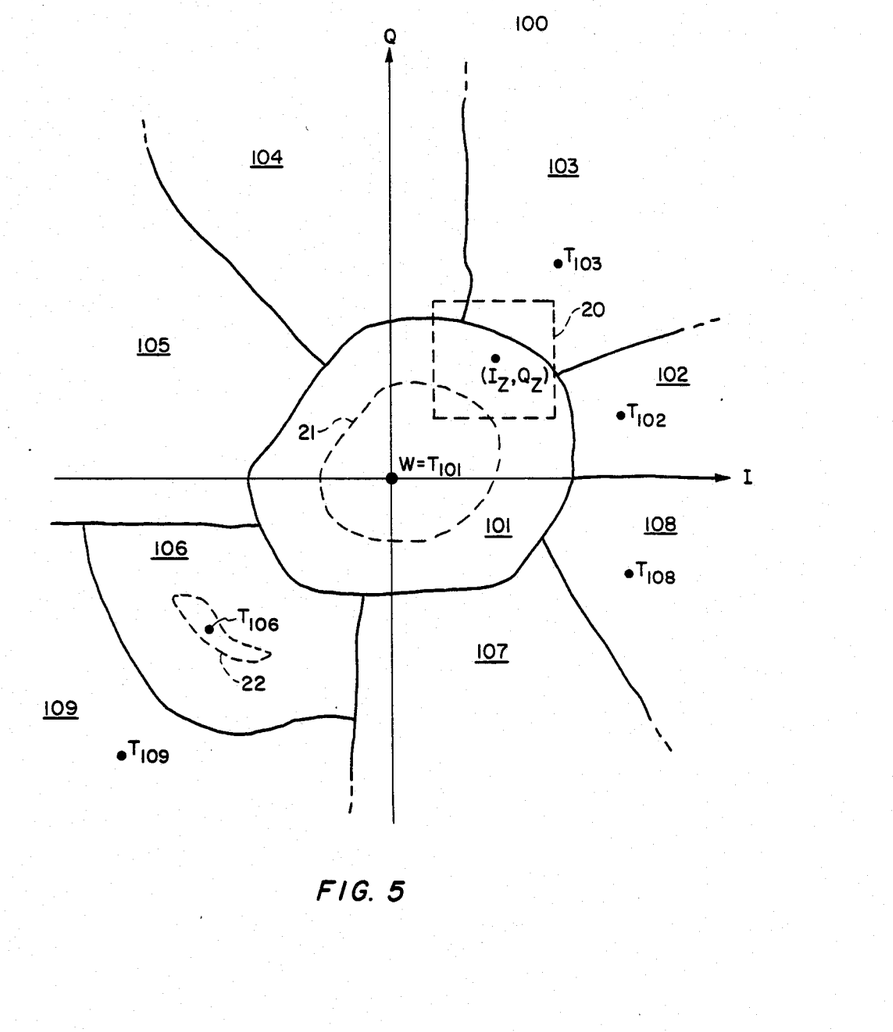
FIG. 5 shows the I-Q plane partitioned irregularly into discrete regions, with a representative tcv for each region.

Persons skilled in the art will understand that I may alter the size and shape of the dither range 20 of FIG. 5 by adjusting the peak-to-peak amplitudues of DI and DQ or by dithering another set of chrominance components. I may, for example, dither hue and chrominance amplitude; or color differences such as R'−Y', G'−Y' and B'−Y', shown herein in FIGS. 9 and 10.

Figure 6:
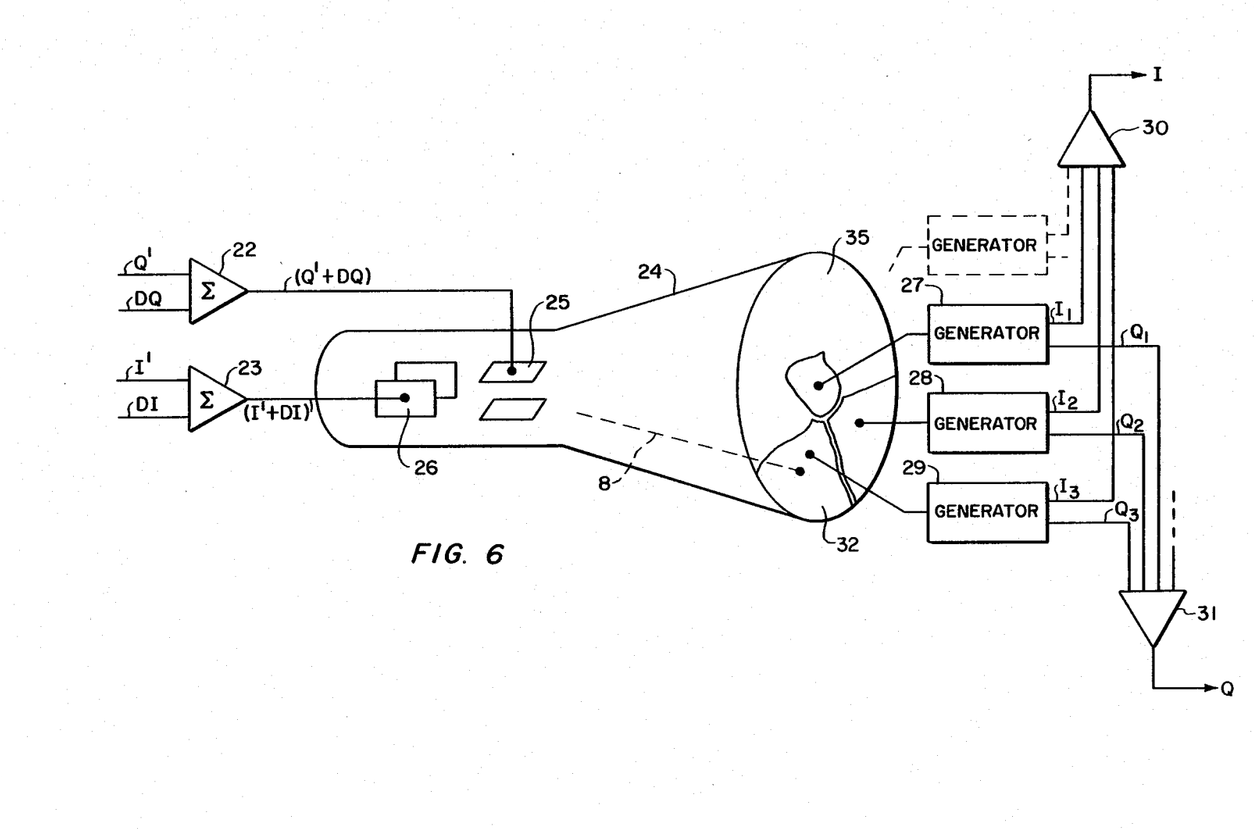
FIG. 6 illustrates schematically an analog means for effecting the kind of chrominance quantization shown in FIG. 5.

FIG. 6 shows one means for dither-quantizing the chrominance vector, according to the principle illustrated with FIG. 5. Special cathode-ray tube 24 includes target 35 whose surface is divided into discrete area analogous to the quantum neighborhoods of FIG. 5 and arranged to deliver signals reporting which area the cathode-ray beam is impinging upon. The target surface and means for detecting the impinged-upon area may be of the prior art as found, for example, in targets and readout means of cathode-ray coding tubes. The figure shows dithered Q' impressed on the vertical deflection plates 25 and dithered I' impressed on the horizontal plates 26; a spot-focused cathode-ray beam 8 lands on a point of target 35 analogous to the dithered chrominance, and the discrete target area is analogous to a quantum neighborhood. Signal generators exemplified by 27, 28 and 29 of FIG. 6 are each one associated with a discrete target area and each generates a pair of signals, coordinates of its particular tcv, when activated by the cathode-ray beam. Persons skilled in the art will understand that I can insure that exactly one signal generator is activated at a time by means of dead spaces between target areas and electric fields that insure that the electron beam always impinges on one target, or by other effective means of prior art. Each of amplifiers 30 and 31 therefore receives a signal on only one of its inputs at a time. For example: when the cathode-ray beam falls on area 32, generator 29 is activated and it supplies $I_3$ to amplifier 30 and $Q_3$ to amplifier 31; the pair of outputs from the two amplifiers represents the tcv ($I_3$, $Q_3$). As exemplified in FIG. 5, I and Q values transmitted for one tcv are generally independent of those transmitted for other tcv's. Therefore, as many as n different I values and n n different Q values may be employed to represent only n tcv's.

The I and Q signals from the means of FIG. 6 may be furnished to communications means 7 and otherwise treated like the I and Q signals of FIG. 1. If I wish, transmission to a receiver can be in a composite signal encoded according to the NTSC composite color format, so that the picture can be displayed on a standard NTSC receiver. However, tcv's produced according to FIG. 6 may be relatively inconvenient to regenerate in a receiver, although such regeneration is an important reason for dither-quantizing NTSC-compatible and related signals. This is not a consideration in digital television systems wherein lookup table means, instead of the means of FIG. 6, quantize the chrominance vector. One arrangement of such a digital system is shown in FIG. 7 and a variation thereof is shown in FIG. 8.

Figure 7:
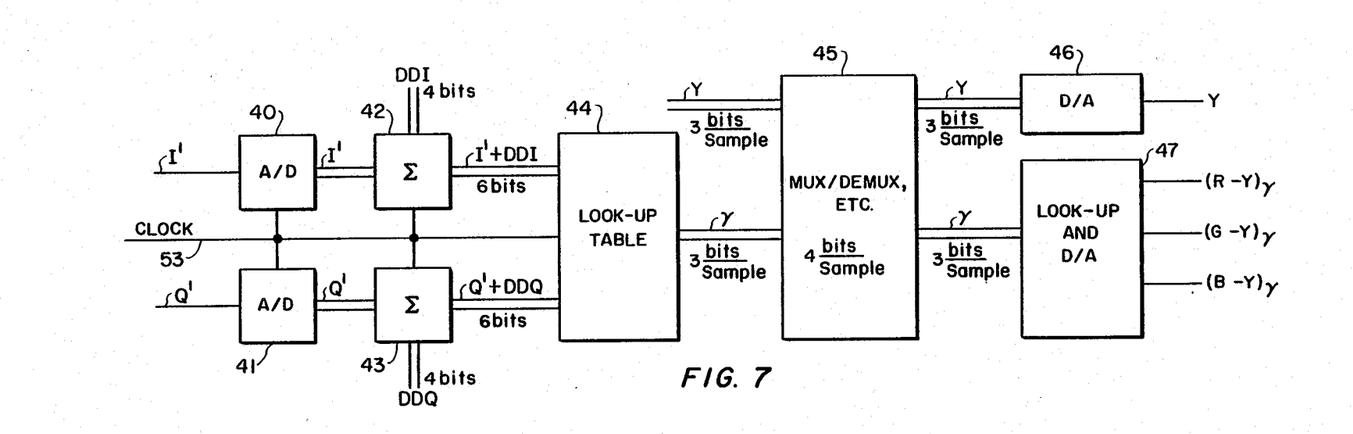
FIG. 7 is a schematic diagram of a digital TV system, including look-up table means for effecting the kind of chrominance quantization represented by FIG. 5.
Figure 8:
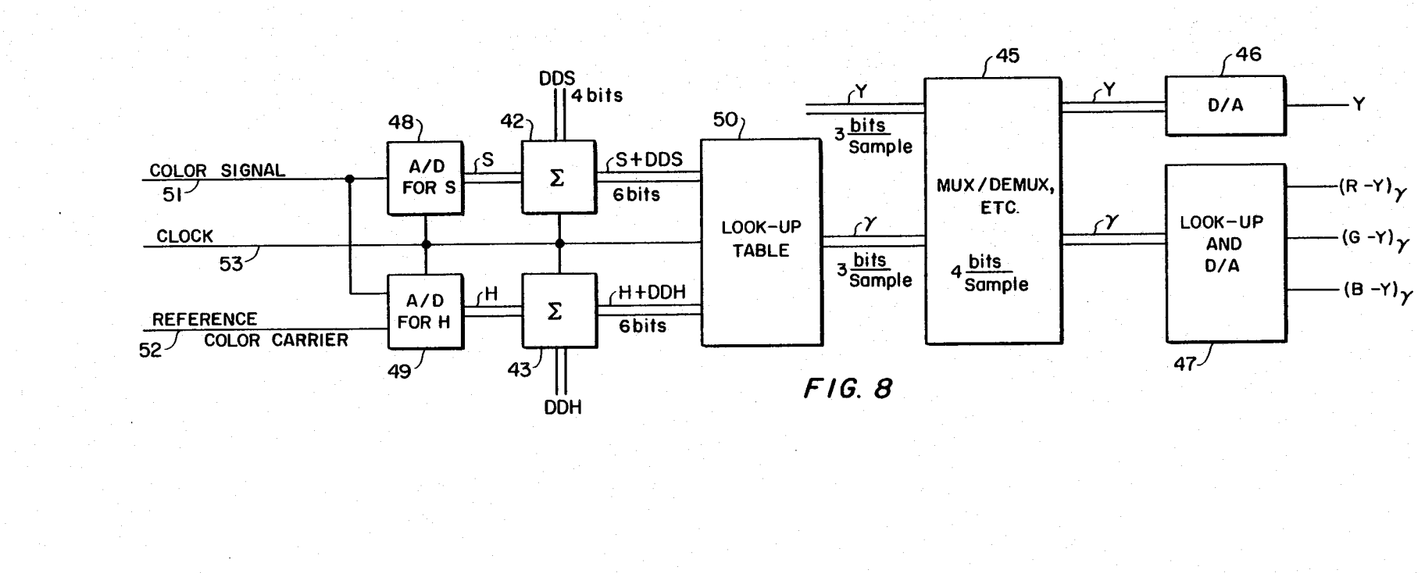
FIG. 8 shows a modification of the system of FIG. 7 dither-quantizing chrominance by somewhat different means.

FIGS. 7 and 8 show two different embodiments of a portion of a color television system arranged to send dither-quantized luminance samples and dither-quantized tcv's by digital means. For both figures, it is assumed that 3-bit luminance samples occur at the rate of approximately $8 \times 10^6$ samples per second and that one tcv, coded with three bits, occurs for every three luminance samples, permitting 4-bit composite samples to be sent at the $8 \times 10^6$ per sec. rate. However, persons skilled in the art will understand that the invention applies equally with other sampling rates and different numbers of bits per sample. FIGS. 7 and 8 differ only in the means for producing tcv's in their transmitter portions. Furthermore, luminance signal Y and clock signal 53 are the same in both transmitters. Y is of prior art and may be obtained by adding dither to the Y' output from matrix 2 of FIG. 1 and digitizing resultant samples. Clock 53 is assumed to have a clock pulse for every three Y samples. The same letter designations are used for the analog and digital forms of a signal. However, a double line on the drawings indicates a digital signal path and a single line is used for analog signals and clock pulses.

Referring now to FIG. 7, inputs I' and Q' may be the chrominance signals put out from matrix 2 of FIG. 1. A/d converter 40 samples I at the rate of clock 53 and digitizes the samples with six bits/sample; likewise, a/d converter 41 digitizes Q with six bits/sample. Dithers DDI and DDQ are digital signals like the 4-bit dithers obtainable as shown in FIG. 8 of the copending application, with d/a converters 87 and 88 omitted and using clock 53 of FIG. 7 for CLI and CLQ of said figure of the copending application. By means of adder 42, samples of DDI are added, in the four least-significant bit places, to concurrent I' samples and the sum I'+DDI is furnished to look-up table means 44. Likewise, Q' and DDQ are added in adder 43 and the 6-bit sum Q'+DDQ is furnished to the same look-up table. Corresponding to each pair of 6-bit inputs, look-up table means 44 (of well-known prior art) specifies one of eight tcv's in terms of a 3-bit number. This results in a stream of tcv samples designated γ which, together with luminance samples Y, go to digital transmission means 45. The look-up table quantizes the chrominance vector and its function is equivalent to that of crt means of FIG. 6. Inasmuch as 6-bit numbers define each directional component of the chrominance plane with about 1.5% resolution, I may provide fewer bits per sample at the look-up table inputs in cases permitting coarser resolution, or more than six bits if I deem it advisable.

Unit 45 of FIG. 7 represents a subsystem that multiplexes together luminance signal Y and chrominance signal γ, transmits the multiplexed information to a receiver, and demultiplexes to recover Y and γ. It may also include means for storage and reproduction, for encryption and decryption, or other such processing. Since the 3-bit Y samples of the figure are assumed to occur at three times the rate of the 3-bit γ pulses, the two signals can be multiplexed into a single stream of 4-bit pulses sent at the Y rate.

The receiver includes d/a converter 46 which decodes Y into analog form and delivers it to cathode 11 of the picture tube of FIG. 1. Chrominance signal γ goes, in the receiver, to unit 47 which comprises look-up table means in combination with d/a converter means. Corresponding to the eight different tcv's represented by the 3-bit γ samples, it furnishes eight possible combinations of the color-difference signals (R−Y)$_γ$, (G−Y)$_γ$ and (B−Y)$_γ$; these may be impressed on color-control grids 12, 13 and 14 of picture tube 15 like the R−Y, G−Y and B−Y signals of FIG. 1.

The embodiment represented schematically by FIG. 8 differs from that of FIG. 7 in that the digital chrominance signal γ is obtained from the NTSC color signal of prior art, instead of from I' and Q' directly. Signal 51 of FIG. 8 is the quadrature-modulated color signal of the NTSC system and 52 is the reference carrier associated therewith. Converter 48 comprises means of prior art for detecting the envelope of 51 and for digitizing samples thereof to generate 6-bit samples designated S, while converter 49 comprises means of the prior art for comparing the carrier phase of signal 51 with that of the reference carrier 52 and for generating a stream of 6-bit samples H indicative of the phase difference. The characteristics of the NTSC system are such that S is a digital representation of chrominance amplitude and H is a digital representation of hue. Therefore, (S,H) expresses chrominance digitally in polar coordinates, essentially equivalent to (I,Q) in rectangular coordinates. With the aid of adders 42 and 43 (similar to those of FIG. 7) digital dither DDS (similar to DDI) is added to S, and DDH (similar to DDQ) is added to H, after which the 6-bit sums S+DDS and H+DDH are furnished to look-up table 50. The latter is similar to 44 of FIG. 7 but arranged to accept dithered S and dithered H as the input variables. Assuming that the γ outputs of both FIG. 7 and FIG. 8 refer to the same set of tcv's, the remaining portions of FIG. 7 may be the same as those already described for FIG. 7.

Figure 9:
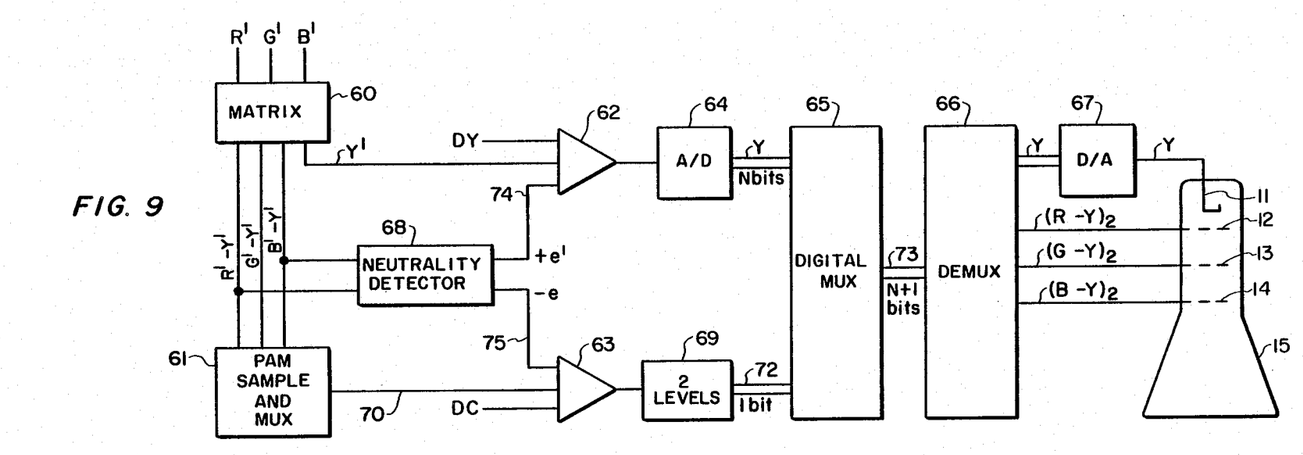
FIG. 9 is a simplified schematic diagram of a digital TV system, transmitting chrominance by means of separately dither-quantized components that lack quantum levels at zero, but transmitting neutral-chrominance samples instantaneously nevertheless.

FIG. 9 exemplifies a digital tv system that produces black-and-white picture details on individual tv frames while sending chrominance by dither-quantized components that lack zero levels. Matrix 60 of the figure receives red, green and blue video signals R', G' and B' from a camera (not shown) and converts them into luminance signal Y' and three color-difference signals R'−Y', G'−Y' and B'−Y'. Although two differences, preferably R'−Y' and B'−Y', are sufficient to define the chrominance, the receiver is simplified and other advantages gained when I transmit all three color differences to a receiver. As in FIGS. 7 and 8, double lines signify digital signalling.

To facilitate explanation of the system operation, first assume that neutrality detector 68 is absent from the FIG. 9 system and that there are no leads 74 and 75 to summing amplifiers 62 and 63. Luminance Y' is, in that case, combined with dither DY in summing amplifier 62 and a/d converter 64 quantizes the sum producing digital signal Y which comprises N-bit samples occurring T times per second (T typically $8 \times 10^6$). PAM multiplexer 61 samples each color difference T/3 times per sec. and interleaves the samples to form multiplex signal 70 comprising T pulse-amplitude-modulated pulses per sec. Signal 70 is combined with dither DC in amplifier 63 and quantized in unit 69 to generate signal 72. Dither DC has T sampes per sec., equivalent to three interleaved dithers for the three color-difference signals, while 69 is a 2-level quantizer, equivalent to a 1-bit a/d converter. Digital signal 72 therefore comprises 1-bit samples synchronous with those of Y. Digital multiplexer 65 combines signals Y and 72 and sends the (N+1)-bit composite signal 73 to a TV receiver. Demultiplexer 66 of the receiver sorts out four component signals including N-bit luminance signal Y and three 2-level color-difference signals. D/a converter 67 decodes Y and furnishes it in analog form to cathode 11 of picture tube 15 (similar to 15 of FIG. 1). Demultiplexer 66 stores all color differences during the 3/T sec. interval between demultiplexed samples so as to furnish substantially continuous 2-level signals $(R-Y)_2$, $(G-Y)_2$ and $(B-Y)_2$ to color-control grids 12, 13 and 14. When black-and-white picture details are scanned, the input color differences R'−Y', G'−Y' and B'−Y' are all zero. However, the 2-level outputs from matrix 66 each have one positive and one negative level (in order to cover the gamut of TV chrominances) and are not able to reproduce these zero differences to generate neutral chrominance elements on each frame. I overcome this limitation with the aid of neutrality detector 68, connected as shown.

Although all three color differences from input matrix 60 are zero when the tv camera scans an area of the picture that has neutral chrominance, the presence of only two zero color differences is sufficient to identify neutrality. Therefore, detector 68 monitors R'−Y' and B'−Y' and detects when they are both in critical ranges near zero, which I may, if I wish, extend to form a neighborhood of neutrality analogous to neighborhood 101 of FIG. 4. The detector may comprise comparator circuits or biased rectifier circuits in combination with logical gates, all in accordance with well-known prior art. So long as both R'−Y' and B'−Y' are in the critical neighborhood, detector 68 puts out a negative signal −e on lead 75 and a positive signal +e' on lead 74; otherwise, these signals are zero.

Negative signal −e goes to summing amplifier 63 and biases the output so that equal negative color differences are presented simultaneously in all three of signals $(R-Y)_2$, $(G-Y)_2$ and $(B-Y)_2$ of the receiver. This condition, which does not normally occur in the standard NTSC system, generates neutral-chromaticity picture elements but also subtracts from the displayed luminance. Therefore, positive signal +e' is added to Y' in summing amplifier 62, and it augments the luminance to compensate for the decrement introduced at the receiver. Black-and-white as well as pointillistically-colored picture details are therefore presented correctly on each frame of the tv display.

Persons skilled in the art will perceive that I may make numerous modifications to the system described with the aid of FIG. 9, without departing from the spirit of the invention. For example: I may provide a positive signal on lead 75 and a negative signal on lead 74 or simultaneously reverse these polarities from time to time; for quantizer 69, I may employ a multi-bit a/d converter having only outputs corresponding to non-zero positive and negative quantum levels; I may omit dither DY and send Y as a simple PCM signal. In particular, I need not send digital signals to the receiver.

It will be obvious to persons skilled in the art that the eight possible arrangements of three 2-level signals on grids 12, 13 and 14 of FIG. 9 generate seven chrominance conditions in picture tube 15, including neutal chrominance and six different hues.

Figure 10:
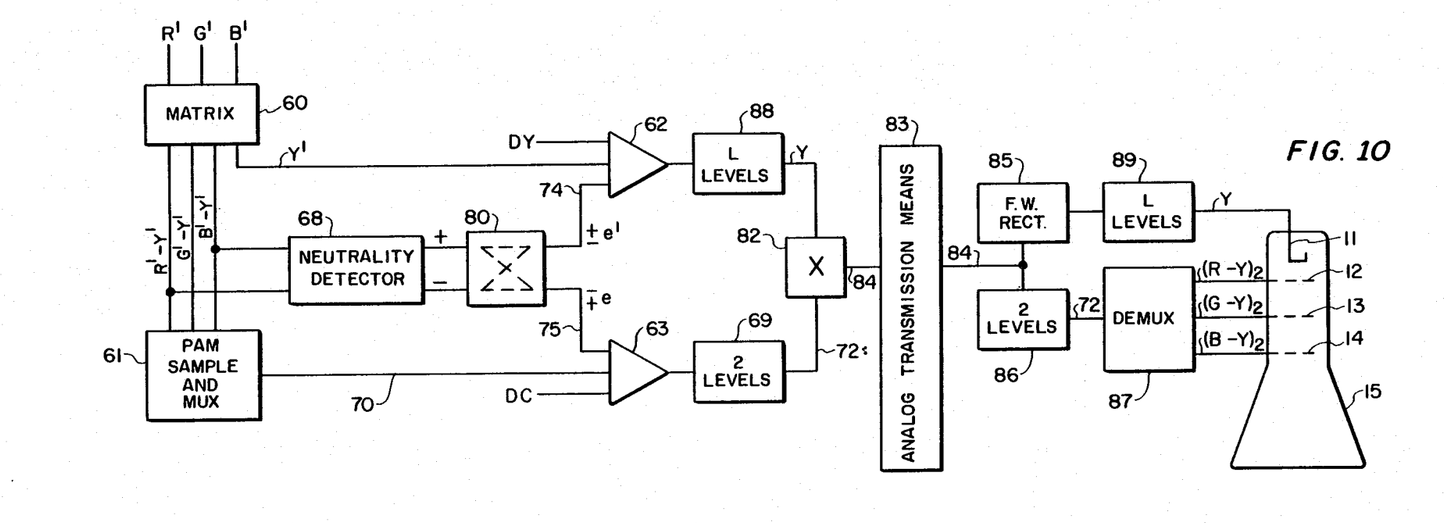
FIG. 10 uses an analog channel to send chrominance by the principle of FIG. 9.

FIG. 10 shows Y (corresponding to dither-quantized luminance) and signal 72 (corresponding to dither-quantized color differences in time-multiplex) transmitted over an analog channel as a stream of composite samples 84. Matrix 60, multiplexer 61, neutrality detector 68, summing amplifiers 62 and 63, and 2-levels quantizer 69 are the same as in FIG. 9 and operate on the same signals. Ignoring, for the present, reversing means 80, −e and +e' go directly to amplifiers 63 and 62, as shown in FIG. 9. In place of a/d converter 64, however, staircase quantizer 88 quantizes the sum Y'+DY, or Y'+DY+e' as the case may be, forming an L-levels signal Y similar to Y of FIG. 1. Quantizers 88 and 69 operate in unison and deliver, simultaneously, L-levels Y samples and positive and negative color-difference samples to multiplier unit 82, similar to the unit designated 74 in FIG. 4 of U.S. Pat. Nos. 4,275,411 and 4,460,924. The multiplier combines Y and 72 into a stream of composite samples wherein the algebraic sign of a sample corresponds to a color-difference sample and its magnitude corresponds to a Y sample.

Over analog channel means 83, the stream of composite samples 84 is sent to full-wave rectifier 85 and 2-levels quantizer 86 of a receiver. The rectifier separates out Y samples, which it delivers, by way of optional quantizer 89 (similar to quantizer 88), to cathode 11 of picture tube 15 (similar to 15 of FIG. 1). Meanwhle, 2-levels quantizer 86 (similar to 69) separates out the samples of signal 72 and delivers them to demultiplexer 87. Finally, the demultiplexer sorts out and stores samples of the three color differences $(R-Y)_2$, $(G-Y)_2$ and $(B-Y)_2$ and delivers them to picture tube 15 in non-return-to-zero form, as in FIG. 9.

Means 80, shown only in FIG. 10, is optional in the systems of FIGS. 9 and 10. By means not shown, it is switchable between two alternative states; and, inasmuch as no other part of the system needs to be set or adjusted to suit, switching may occur at regular intervals, irregularly in response to a circuit-monitoring signal, or even arbitrarily. Means 80 reverses the algebraic signs of the signals on leads 74 and 75 (going to summing amplifiers 62 and 63, respectively) with opposite polarities that depend on its state.

Except for having three, rather than two, time-multiplex chrominance components, signal 84 of FIG. 10 is similar to the signal comprising composite samples shown in FIGS. 5, 6 and 9 of the related U.S. Pat. Nos. 4,275,411 and 4,460,924. It will be clear to persons skilled in the art that FIG. 10 is exemplary and that I may employ various alternative known means to send luminance signal Y and the color-difference signals 72 over analog channels. It will also be clear that Y may be an unquantized analog signal.

Whereas the copending application discloses encoding of chrominance information and luminance information into a regenerable composite signal that is compatible with NTSC and other standard receivers of prior art, I may dither-quantize the chrominance constituent of such composite signal in accordance with teaching of the present application; and in many typical instances the dither-quantizing of the present application is, in my belief, the best method.

Although the the invention has been described in relation to TV systems that also transmit a dither-quantized luminance constituent, it will be obvious to persons skilled in the art that chrominance may be transmitted according to the invention while luminance is sent by means not involving dither-quantized signals, or even quantized signals of any sort.

Various other alternatives and modifications to the specific structues set forth herein will be obvious to persons having ordinary skill in the art. Therefore, whereas the invention has been described in connection with several exemplary embodiments thereof, the present application is intended to cover any adaptations or variations thereof; and it is manifestly intended that the invention be limited only by the claims and equivalents thereof.

I claim:

1. A system for transmittng color television comprising:
   means for obtaining three video signals corresponding to primary-color television picture components;
   means for deriving a luminance signal corresponding to said components;
   means for obtaining color-difference signals corresponding to the differences between said primary-color signals and said luminance signal;
   means for dither-quantizing said color-difference signals;
   means for detecting zero chrominance, for transmitting three substantially equal signals for picture details in which substantially zero chrominance is detected and for transmitting three dither-quantized color-difference signals, including unequal signals, otherwise; and
   means for transmitting the luminance signal adjusted in one manner when zero chrominance is detected and in another manner otherwise.

2. The system of claim 1 including:
   means for quantizing color-difference signals according to two levels;
   means for quantizing the equal signals indicative of zero chrominance to a color-difference level;
   means for time-multiplexing samples of the color-difference signals or samples of the equal signals, whichever is transmitted;
   means for sampling the luminance signal in synchronism with the time-multiplexed samples; and
   means transmitting composite samples wherein the algebraic sign of a sample corresponds to a time-multiplexed sample and the magnitude corresponds to a luminance sample.

3. Television apparatus transmitting a pointillistically colored television picture, said apparatus comprising:
   means for obtaining a set of video signals corresponding to successively scanned elements of the television picture, said set including a pair of signals one thereof varying according to one vector component of the chrominance of said successively scanned elements, the other varying according to another vector component of said chrominance;
   means for combining said pair of signals with dither;
   means for quantizing the vector sum of said pair with added dither, whereby the chrominance of a scanned element is quantized according to discrete chrominance values including a value corresponding to zero chrominance; and
   means for transmitting information corresponding to said discrete chrominance values.

4. The apparatus of claim 3 transmitting a sequence of television frames suitable for the display of a moving picture scene on a television receiver, comprising:
   means for representing one frame of the picture by differently colored, including gray, patches intermixed in one pointillistic arrangement, and for representing a subsequent frame of the same picture by similar patches intermixed in another arrangement, regardless of whether picture details have remained stationary and unchanged.

5. A method of dither-quantizing chrominance information for color television, comprising:
   obtaining a set of chrominance signals, including a pair of component signals sufficient to define a chrominance vector lying in a chrominance plane and extending from a fixed origin to a variable terminal point;
   dithering said chrominance vector by combining a component signal with dither;
   effectively dividing said chrominance plane into neighborhoods, including two adjacent neighborhoods separated by a boundary other than a locus of constant values of a component signal;
   representing each said neighborhood by a representative vector; and
   transmitting a series of representative vectors corresponding to the neighborhoods containing terminal points of successive samples of the dithered chrominance vector.

6. A television system transmitting chrominance information by the method of claim 5 and including receiving means.

7. A method for dither-quantizing chrominance information for television, comprising:
obtaining a set of chrominance signals, including a pair of component signals sufficient to define a chrominance vector, said vector lying in a chrominance plane and extending from a fixed origin to a variable terminal point;
dithering said chrominance vector by combining a component signal with dither;
effectively dividing said chrominance plane into discrete neighborhoods including a particular neighborhood that contains the point corresponding to neutral chrominance;
representing said particular neighborhood by a vector corresponding to neutral chrominance and other neighborhoods by vectors corresponding to other discrete values of chrominance; and
transmitting a series of representative vectors corresponding to the neighborhoods containing terminal points of a series of samples of the dithered chrominance vector.

8. A television system transmitting television information by the method of claim 7 and including receiving means.

9. The method of claim 7 transmitting a set of three 2-level color-difference signals arranged in a manner sufficient to define the neutral chrominance vector and six other chrominance vectors.

10. Means for dither-quantizing chrominance information, comprising:
means for combining a pair of component chrominance signals with dither;
means for effectively dividing the chrominance plane into discrete neighborhoods; and
means for generating transmittable chrominance vectors, each designating a neighborhood, including a transmittable vector corresponding to zero chrominance.

11. Television signaling apparatus transmitting a signal according to claim 10 and a luminance signal, and including means for incorporating said signals into a regenerable composite signal.

12. The apparatus of claim 11 wherein said composite signal is, without change of circuit connections, interchangeable with another composite signal at the input terminals of a television receiver for display of the picture, said another composite signal being characterized by component video signals in all of which the inherent samples have a continuous range of possible amplitude values.

13. The means of claim 10 wherein said means for effectively dividing includes a look-up table.

14. The means of claim 10 wherein said means for effectively dividing includes cathode-ray-tube means.

15. The means of claim 10 combining a digital component chrominance signal with a digital dither signal.

16. Means for dither-quantizing the chrominance constituent of a television signal, comprising:
means for obtaining a pair of component chrominance signals;
means for combining said pair with dither to obtain a resultant pair;
quantizing means providing for each signal of said resultant pair a quantum level, designated zero level, such that a pair of zero quantum levels can be transmitted to produce a black, white or gray picture element on a compatible television receiver.

17. The means of claim 16 wherein the means for quantizing a signal provides said quantum level designated zero level, a quantum level more positive than the zero level, and a quantum level more negative than the zero level.

18. The means of claim 16 wherein a signal of said resultant pair is quantized according to only three levels.

19. A method for transmitting television chrominance information comprising:
(a) scanning successive samples of a television picture;
(b) generating plural component chrominance signals quantifying a variable chrominance vector according to the chrominance of successive samples;
(c) dithering a component chrominance signal;
(d) classifying values of the variable chrominance vector in a manner that effectively divides the vector plane of said vector into plural discrete neighborhoods, including a neighborhood that contains the zero value of chrominance; and
(e) transmitting information designating successive discrete neighborhoods pertaining to successive samples of the television picture.

20. The method of claim 19 dithering said component chrominance signal differently on different frames of the television picture.

21. Means for transmitting television chrominance information by the method of claim 19, comprising:
means for scanning a television picture;
means for generating plural component chrominance signals;
means for dithering a component chrominance signal;
means for effectively dividing the chrominance vector plane into neighborhoods; and
means for transmitting information designating neighborhoods.

22. A television system transmitting chrominance information by the means of claim 21 and including receiving means.

* * * * *